Jan. 11, 1955  W. F. GRATTAN  2,699,237
POWER TRANSMISSION
Filed June 12, 1953  2 Sheets-Sheet 1

INVENTOR.
Worthin F. Grattan
BY
Patent Agent

Jan. 11, 1955   W. F. GRATTAN   2,699,237
POWER TRANSMISSION

Filed June 12, 1953

2 Sheets-Sheet 2

INVENTOR.
Worthin F. Grattan

BY

Patent Agent

United States Patent Office 2,699,237
Patented Jan. 11, 1955

2,699,237

POWER TRANSMISSION

Worthin F. Grattan, Sparks, Nev.

Application June 12, 1953, Serial No. 361,209

2 Claims. (Cl. 192—3.2)

The present invention relates to power transmission systems and more particularly to power transmissions for automobiles.

Of late, automobile transmissions have incorporated one or another form of fluid coupling which enable a rapid and smooth variation in torque over a relatively wide range. However, this advantage provided by fluid couplings as opposed to the more conventional gear-train transmissions is offset to a certain degree by a lessening in the operating efficiency, as evidenced by the somewhat lower gasoline mileage obtained in automobiles wherein fluid couplings are employed. In order to minimize the effect of this decreased efficiency when fluid couplings are utilized, certain transmissions now incorporate a mechanical clutch adapted to rigidly connect the driving and driven members upon the attainment of a predetermined cruising speed of the automobile, say 40 miles per hour. However, under certain conditions where rapid acceleration is desired and the car is traveling above the predetermined critical speed, the increased torque required is not available as it would be if the fluid coupling were still established.

Accordingly, it is an object of the present invention to maintain all the advantages of automobile transmissions as described above while at the same time providing positive control of the acceleration of the automobile regardless of its speed.

It is another object of the invention to provide in an automobile transmission of the type described including a fluid coupling and a mechanical clutch, means whereby the clutch may be arbitrarily released and the fluid coupling re-established.

It is a further object of the invention to provide in an automobile transmission, wherein a fluid coupling is arranged to actuate engagement of a centrifugal clutch at a predetermined speed of the automobile, an arrangement for releasing the clutch at will.

Yet another object of the invention is to provide a mechanical release mechanism for a friction clutch, such as the centrifugal clutch hereinbefore mentioned.

Figure 1:
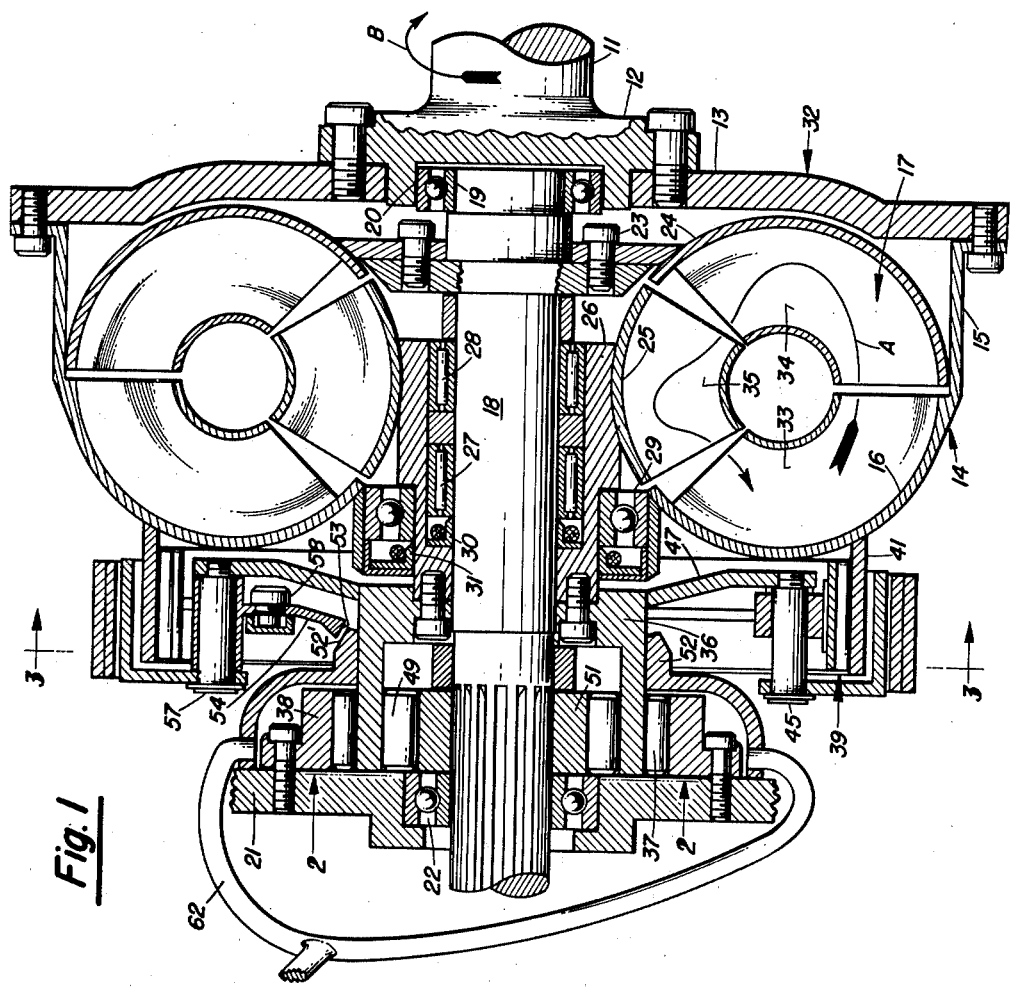
Figure 2:
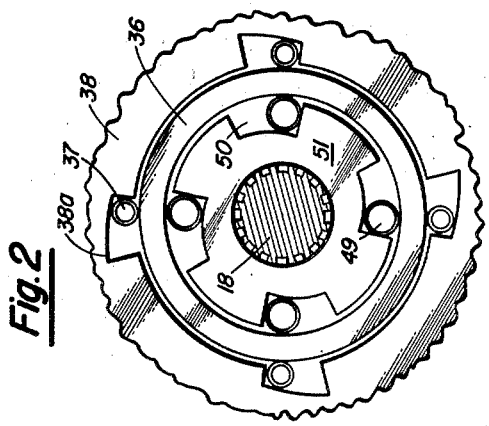
Figure 3:
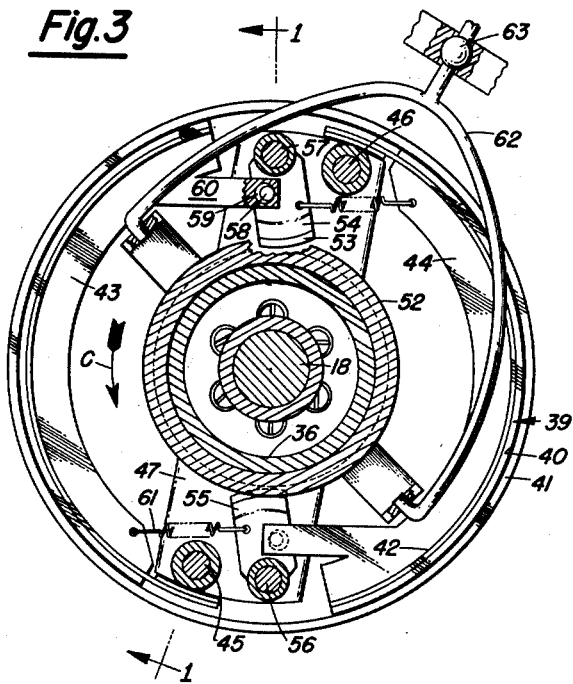
Figure 4:
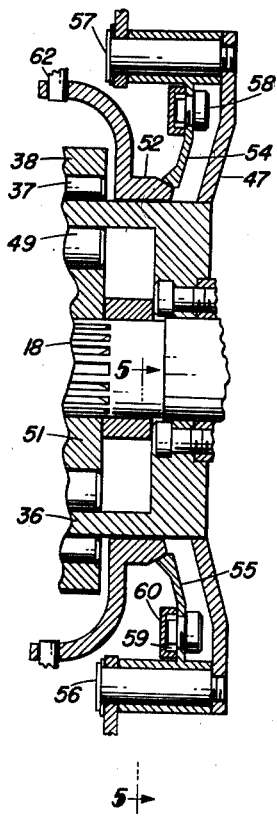
Figure 5:
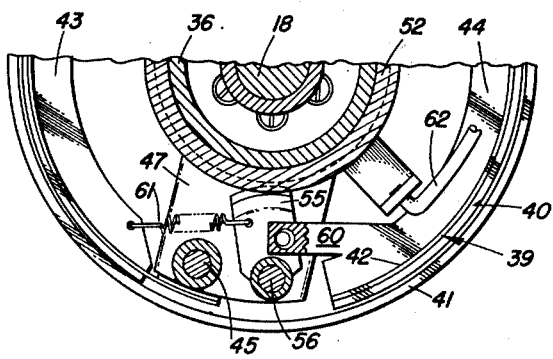

These and other objects of the invention as well as the inherent advantages thereof will become apparent from the following description of the accompanying drawings wherein:

Figure 1 is a central section through an automobile transmission embodying the present invention, the section line being indicated at 1—1 in Figure 3, Figure 2 is a cross section taken along line 2—2 of Figure 1 showing the construction of an overrunning clutch which constitutes a part of the transmission of the invention, Figure 3 is a section taken along line 3—3 of Figure 1 illustrating the centrifugal clutch and the associated release mechanism, Figure 4 is a central section of the centrifugal clutch similar to the corresponding portion shown in Figure 1, but with the release mechanism moved into clutch disengaging position, and Figure 5 is a fragmentary section taken along line 5—5 of Figure 4.

With particular reference to Figure 1, there is shown the terminal end of the drive shaft 11 of an automobile engine. An integral circular flange 12 is formed on the drive shaft 11 so as to support an annular wall 13 to the periphery of which is bolted a circular casting 14 which comprises a short cylindrical portion 15 and an inwardly curving portion 16, the latter forming one wall segment of a generally doughnut-shaped tunnel 17 that encompasses the end of a second shaft 18. This shaft 18 is rotatably supported in axial alignment with the described drive shaft 11 in bearings 19 and 22 within a counterbore 20 in the drive shaft and in the end wall 21 of a reverse gear housing at the other end of the transmission. To this second shaft 18 is secured by means of bolts 23 a second wall segment 24 of the previously mentioned tunnel 17. A third segment 25, which completes the tunnel formation, is rigidly secured to a sleeve 26 which encompasses, and is arranged for rotation relative to, the described second shaft 18 by axially spaced sleeve bearings 27, 28 and for rotation relative to the first described tunnel-forming segment 16 and consequently the drive shaft 11 by ball bearings 29. Suitable seal rings 30, 31 are provided adjacent each of the described bearings so that in effect an enclosed fluid-tight housing is formed which is generally indicated by the numeral 32 and into which the second shaft 18 extends, said housing being defined by the described annular wall 13, the short cylindrical section 15 extending therefrom, the inwardly curving wall segment 16, the sleeve 26 and the seal rings 30, 31 positioned interiorly and exteriorly thereof. In practical performance of the described transmission said housing is filled with a suitable fluid.

A plurality of inwardly extending vanes 33, 34, 35 are formed on the described tunnel-forming segments 16, 24, 25 respectively which vanes provide for the transfer of kinetic energy between the fluid and the segments. The vanes 33 on the first segment 16 are so configurated as to impel fluid in an angularly rightward direction as indicated by the elongated curved arrow A shown in Figure 1 when the drive shaft 11, connected to those vanes and constituting in conjunction therewith the driving member of the fluid coupling, is rotated clockwise as viewed from the right of Figure 1 and as indicated by the arrow B. When the fluid is driven in this manner, its kinetic force is transmitted to the vanes 34 on the second wall segment 24 of the tunnel 17 so as to impart rotation in a clockwise direction to the second or driven shaft 18. The configuration of these second or driven vanes 34 is such that the fluid, having transmitted its force thereto, is thence directed as indicated by the continuing arrow A towards the vanes 35 on the sleeve-supported tunnel segment 25 whereby a reactive force tending to rotate the sleeve 26 in a direction opposite to the rotation of the driving and driven vanes 33 and 34 is produced. However, such counterclockwise rotation of these vanes 35 and the sleeve 26, as viewed from the right of Figure 1, is precluded by an overrunning clutch arrangement. This arrangement includes a tubular member 36 which is bolted to the sleeve 26 at its one end and is encompassed at its other end by a plurality of rollers 37, each of which is mounted in an arcuately-inclined recess 38a in the inner surface of a large diameter ring 38 rigidly secured to the end wall 21 of the previously mentioned reverse gear housing. Since the vanes 35 secured to the sleeve 26 are thus precluded from counterclockwise rotation, the fluid impelled thereagainst by the driven vanes 34 is redirected toward and in the direction of rotation of the driving vanes 33 thereby producing the maximum efficiency of fluid coupling. When the driven vanes 34 have approached the rotative speed of the driving vanes 33, the reactive force component of the fluid against the redirecting vanes 35 is lessened and eventually diminished to a point where the latter vanes start to rotate in a clockwise direction and eventually assume a rotative speed approximating that of the driving and driven vanes.

At this point the torque requirements for maintaining the speed of the automobile are reduced, and consequently means are provided to establish a direct mechanical connection between the driving and driven shafts so as to eliminate the losses inherent in the fluid coupling. Preferably such means take the form of a centrifugal type clutch 39 as best illustrated in Figure 3. One face 40 of the clutch is formed by the interior surface of a cylindrical stub 41 which is secured by welding to the first wall segment 16 of the described tunnel 17 and accordingly rotates with the drive shaft 11. The other face 42 of the clutch 39 is formed by the outer surfaces of two like, arcuate clutch shoes 43, 44 pivoted on pins 45, 46 at opposite ends of a plate 47 that is centrally secured to the previously described tube 36 which rotates with the redirecting vanes 35. Accordingly, upon the attainment of a predetermined rotative speed of the redirecting vanes 35 in the direction of rotation of the drive shaft 11, as indicated by the arrow C in Figure 3, the pivoted clutch shoes 43, 44 move into frictional engagement with the interior of the described cylindrical stub 41. Consequently, a direct mechanical connection is established from the drive shaft 11 through the clutch 39 and the supporting plate 47 to the tube 36. This tube in turn is connected to rotate the driven shaft 18 through a second overrunning clutch 48 which comprises a plurality of rollers 49 in inclined recesses 50 in the periphery of a ring 51 fastened to the driven shaft 18 coaxially within the aforementioned ring 38 that is rigidly secured to the end wall 21 of the reverse gear housing. When the mechanical connection is thus made, the fluid coupling is effectively bypassed. The exact moment at which the mechanical connection is established can be determined by a suitable spring means, one form of which, particularly applicable to the present device, will be hereinafter described. Normally the setting is such that when an automobile has attained a speed of approximately 40 miles per hour and is no longer accelerating the connection will be established.

With the device constructed as described to this point, rapid acceleration from a speed of 45 miles per hour, for example, to a speed of 60 miles per hour, is impossible. If such acceleration were desired, it would first be necessary to permit speed of the automobile to drop to 15 or 20 miles per hour so as to disengage the centrifugal clutch and re-establish the fluid coupling whereupon rapid acceleration to 60 miles per hour could be obtained. It is apparent that such a transmission requiring deceleration to enable subsequent rapid acceleration might on occasions be unsafe. As one example, it might well be impossible when passing another automobile on an upgrade to avoid a collision with an oncoming car.

In accordance with the present invention, a release mechanism is arranged to enable disengagement of the described centrifugal clutch and re-establishment of the fluid coupling arbitrarily at any time and at any speed of the automobile. For this purpose a ring 52 (Figures 1, 3, 4 and 5) is supported for axial sliding movement on the described tube 36 and has an outer bevelled surface as shown at 52' which is adapted to engage the complementary bevelled and curved inner end 53 of each of a pair of dogs 54, 55 (Figure 3) pivoted on pins 56, 57 placed respectively in rotatively advanced position of the clutch shoe pivot pins 45, 46 on their supporting plate 47. At a central position on each dog 54, 55 a small pin 58 is adapted to loosely enter a hole 59 at the end of a tie rod 60 rigidly secured to and extending from the free end of the adjacent clutch shoe 43 or 44, as the case may be. A spring 61 is tensioned between each dog and the opposite clutch shoe adjacent its pivot point to simultaneously determine the normal pivotal position of the dog and to hold the associated clutch shoe out of engagement with the previously described cylindrical stub 41 until the desired predetermined cruising speed is obtained.

In order to move the ring 52 into frictional engagement with the dogs 54 and 55 a yoke 62 is connected to the ring at diametrically opposite points and is pivoted to a suitable portion 63 of the automobile frame for actuation either by a hand control lever or preferably by full depression of the foot accelerator pedal of the automobile (not shown).

When the accelerator pedal is fully depressed, the yoke 62 is swung about its pivot so as to urge the ring 52 to the right from the position shown in Figure 1 to that shown in Figure 4 whereat the bevelled surfaces on the ring 52 and on the dogs 54, 55 are brought into frictional engagement. Since the ring 52 is fixed against rotation by its connection with the yoke 62 and the dogs are supported on the plate 47 which rotates in a counterclockwise direction as indicated by the arrow C in Figure 3, a frictional force is applied to the dogs which cams each of them in a counterclockwise direction from the position in Figure 3 to that illustrated in Figure 4 so that, as illustrated in the latter figure, the clutch shoes 43, 44 are disengaged from the rotating cylindrical stub 41. Continued frictional drag on the dogs 54, 55 also stops the rotation of their supporting plate 47, the tube 36, the sleeve 26, and consequently the redirecting vanes 35. Thus not only is the mechanical connection broken and the fluid coupling re-established, but the redirecting vanes 35 are brought to a stop, whereby maximum accelerating torque can be immediately attained. Accordingly a rapid acceleration of from 45 to 60 miles per hour, reverting to the previous example, is facilitated and safe driving is enhanced.

It will be understood that many variations and modifications of the described structure may be made without departing from the spirit of the present invention, and I therefore do not wish to be limited to the details described but give reference instead to the appended claims.

I claim:

1. An arrangement for releasing a centrifugal clutch having a clutch shoe pivoted at one end to a rotating element for movement under centrifugal force into a position of engagement which arrangement comprises a ring placed concentrically of the rotative axis, means supporting said ring for axial movement but precluding rotative movement thereof, a member pivoted on the rotating element adjacent the free end of the pivoted clutch shoe so as to extend generally radially inwardly toward the rotative axis, means pivotally connecting said member to the free end of the clutch shoe, said pivoted member being arranged so that its inner end is engaged by said ring when the latter is moved axially whereby the frictional force of engagement effects pivotal movement of said pivoted member so as to retract the clutch shoe from its position of engagement.

2. A power transmission comprising a driving member arranged to impel an enclosed fluid, a driven member arranged to receive kinetic force from the moving fluid, rotatably supported means arranged to return the fluid from said driven member to said driving member when the latter is rotating faster than said driven member but to rotate substantially in unison with the said driving and driven members when they are rotating at the same speed, a centrifugal clutch supported for rotation with said rotatably supported means and arranged to mechanically couple said driving and driven vanes at a predetermined rotative speed, and means to release said clutch and re-establish the fluid coupling, said means comprising a ring, means supporting said ring concentrically of the rotative axis of the transmission for axial movement therealong but precluding rotative movement thereof, and a member operatively connected to said clutch and positioned for engagement by said ring upon axial movement of said ring such that the frictional force of engagement effects disengagement of said clutch and stops rotation of said rotatably supported means.

References Cited in the file of this patent

UNITED STATES PATENTS

| Number | Name | Date |
|---|---|---|
| 1,878,824 | Dodge | Sept. 20, 1932 |
| 2,355,709 | Dodge | Aug. 15, 1944 |
| 2,616,537 | Grattan | Nov. 4, 1952 |
| 2,640,572 | O'Brien | June 2, 1953 |